(12) United States Patent
Zhang et al.

(10) Patent No.: US 7,593,374 B2
(45) Date of Patent: Sep. 22, 2009

(54) MULTI-TO-MULTI POINT AD-HOC WIRELESS DATA TRANSFER PROTOCOL

(75) Inventors: Lin Zhang, Beijing (CN); Bob S. G. Chou, Newtown, PA (US); Haoxiang Zhang, Beijing (CN); Zhe Yu, Beijing (CN); Lei Yang, Beijing (CN)

(73) Assignee: WiNet Labs Ltd., Beijing (CN)

( * ) Notice: Subject to any disclaimer, the term of this patent is extended or adjusted under 35 U.S.C. 154(b) by 412 days.

(21) Appl. No.: 11/121,837

(22) Filed: May 2, 2005

(65) Prior Publication Data

US 2005/0254471 A1   Nov. 17, 2005

Related U.S. Application Data

(60) Provisional application No. 60/566,897, filed on Apr. 30, 2004.

(51) Int. Cl.
*H04Q 7/24* (2006.01)
*H04J 1/16* (2006.01)
*H04Q 7/00* (2006.01)

(52) U.S. Cl. .................. 370/338; 370/255; 370/331; 370/252

(58) Field of Classification Search .............. 455/550.1, 455/520, 445, 41; 370/338, 254, 344, 230, 370/401, 225, 395.4, 331, 458, 389; 709/222, 709/204
See application file for complete search history.

(56) References Cited

U.S. PATENT DOCUMENTS

| | | | | |
|---|---|---|---|---|
| 5,218,676 | A  * | 6/1993  | Ben-Ayed et al. | 709/240 |
| 6,618,355 | B1 * | 9/2003  | Gulliford et al. | 370/230 |
| 7,006,453 | B1 * | 2/2006  | Ahmed et al. | 370/255 |
| 2002/0094780 | A1 * | 7/2002  | Payton et al. | 455/41 |
| 2004/0174829 | A1 * | 9/2004  | Ayyagari | 370/254 |
| 2004/0240457 | A1 * | 12/2004 | Habetha et al. | 370/401 |
| 2005/0007991 | A1 * | 1/2005  | Ton et al. | 370/349 |
| 2005/0111428 | A1 * | 5/2005  | Orlik et al. | 370/344 |
| 2005/0153725 | A1 * | 7/2005  | Naghian et al. | 455/520 |
| 2006/0015596 | A1 * | 1/2006  | Mar et al. | 709/222 |

* cited by examiner

*Primary Examiner*—Charles N Appiah
*Assistant Examiner*—Kiet Doan (57) ABSTRACT

A wireless communication system utilizes a protocol for creating a multi-to-multi point, extendable, ad-hoc wireless network. A hardware platform enables an electronic device to connect in an ad-hoc network. Accordingly, each electronic device with such a hardware platform of a plurality of such electronic devices functions as node in a network. The nodes function according to the protocol for form ad-hoc networks and to communicate data therebetween.

20 Claims, 8 Drawing Sheets

*FIG. 13*

MULTI-TO-MULTI POINT AD-HOC WIRELESS DATA TRANSFER PROTOCOL

CROSS-REFERENCE TO RELATED APPLICATION

The present application claims priority under 35 U.S.C. 119(e) on U.S. Provisional Application for Patent Ser. No. 60/566,897 filed Apr. 30, 2004, the entire disclosure of which is incorporated herein by reference.

BACKGROUND OF THE INVENTION

The present invention relates to communication systems and, in particular, to wireless communication systems.

Examples of conventional wireless communications systems include Bluetooth and IEEE 802.11 protocols. The Bluetooth protocol is a strict hierarchical structure, while the IEEE 802.11 protocol is a pure flat layer structure. While conventional communications protocols provide effective wireless communications, there is a continued need in the art for improved wireless systems with enhanced qualities and parameters.

SUMMARY OF THE INVENTION

According to one of the aspects of the invention, a communication system utilizes a process for creating a multi-to-multi point, extendable, ad-hoc wireless network. The network's overall transfer rate and range may depend on the radio chipset technology used. The methods and apparatus of the invention enable a plurality of electronic devices to connect in an ad-hoc network.

The invention enjoys a number of advantages over conventional wireless data transfer software or firmware protocols and over similar applications that currently employ alternative radio technology. For example, the invention improves upon Bluetooth's strict hierarchical structure and the IEEE 802.11's pure flat layer structure. It provides a collision-free atmosphere in a single SS scenario and a fairly low collision probability in a multi-SS scenario.

Other features and advantages of the present invention will become apparent to those skilled in the art from a consideration of the following detailed description taken in conjunction with the accompanying drawings.

DETAILED DESCRIPTION OF THE INVENTION

Figure 1:
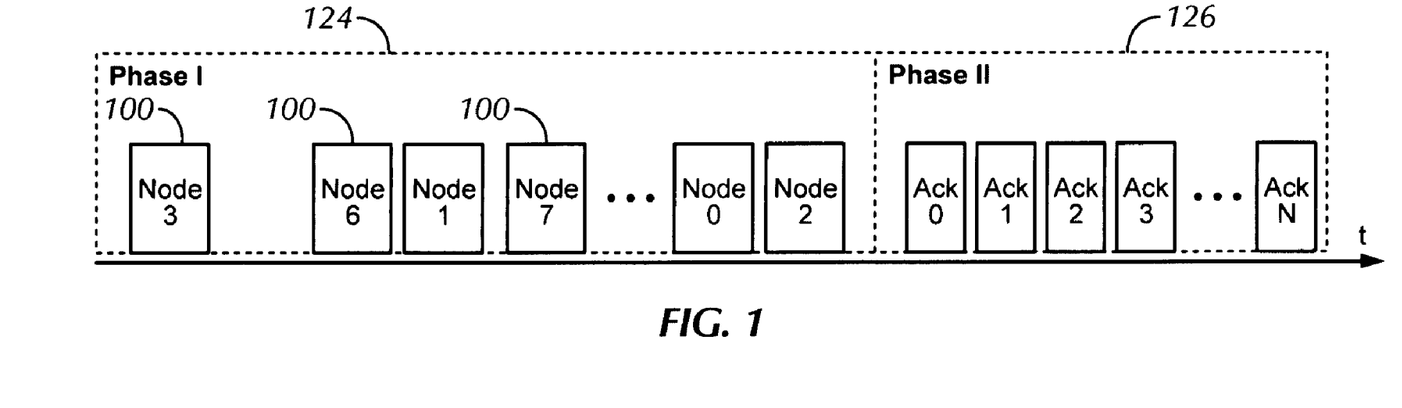
FIG. 1 illustrates the formation of a solar system (SS)
Figure 2:
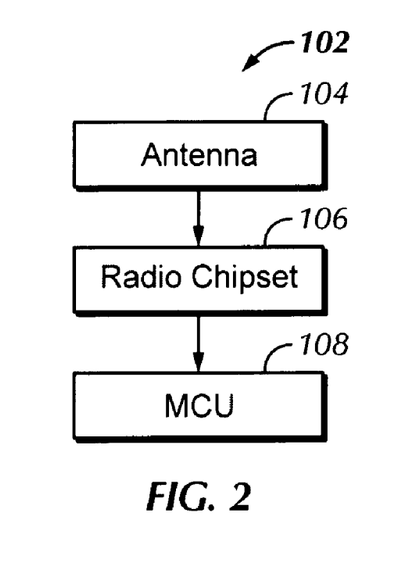
FIG. 2 is a block diagram of a hardware platform of the invention.
Figure 3:
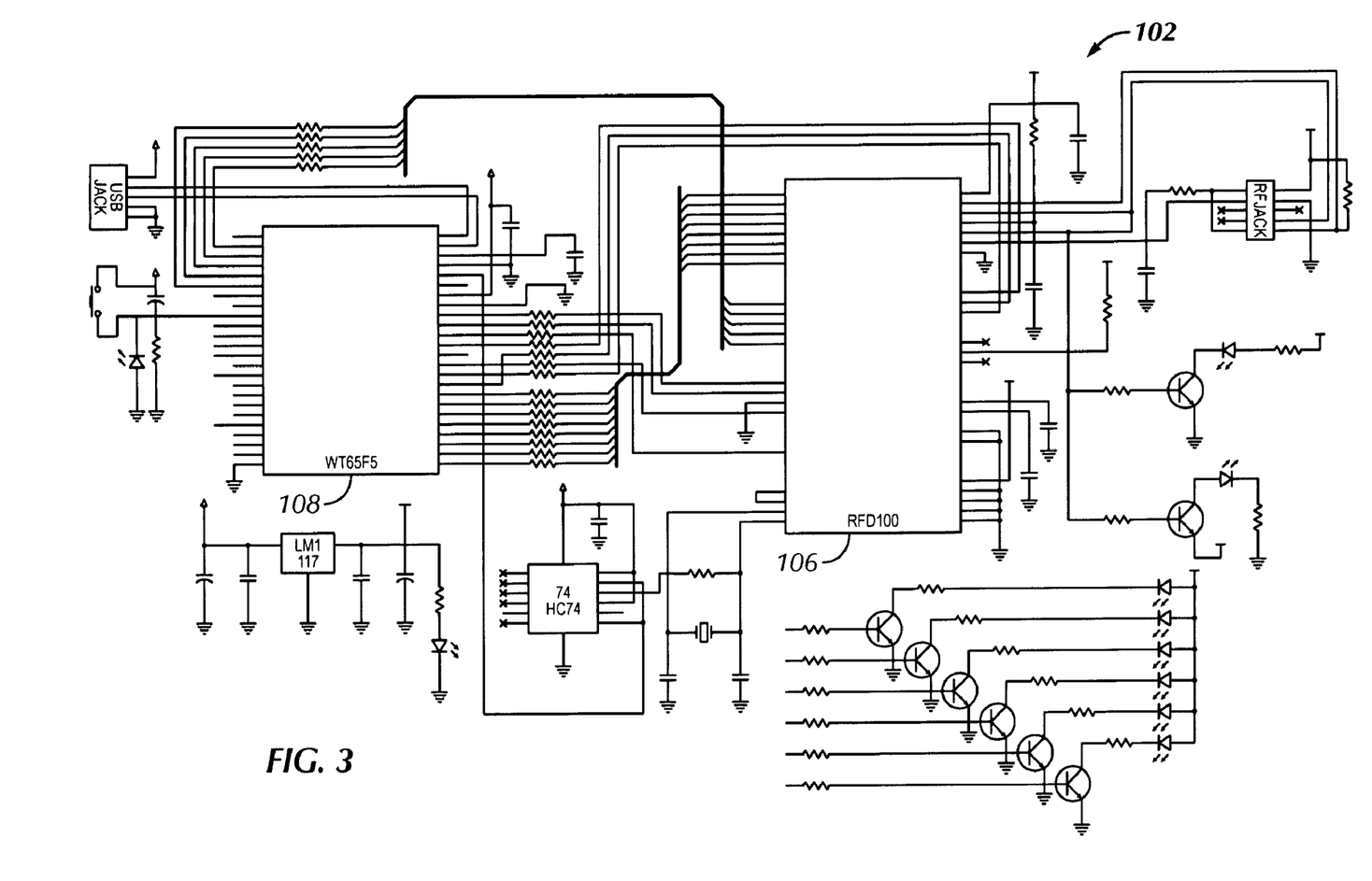
FIG. 3 is a schematic diagram of an example of a hardware platform.

As shown in FIG. 1, the invention may be embodied in individual nodes 100. A node 100 may include a hardware platform and either software or firmware. According to a number of embodiments, a hardware platform 102 as shown in FIG. 2 may include an antenna 104 (e.g., printed circuit board antenna or chip that acts as an antenna), a radio chipset 106 (e.g., RFWaves 102 and D100 radio chipset, or Nordic NRF905), and a microprocessor control unit (MCU) 108 (e.g., standard 8051, TI MSP320, or ARM7). A specific schematic example of the hardware platform 102 is illustrated in FIG. 3. Source code may be either written on the MCU 108, in which case it constitutes software, or embedded in the MCU 108, in which case it constitutes firmware. Accordingly, the hardware platform 102 is configured to enable wireless communication of data.

A node 100 may be either connected to (e.g., by way of an external plug, key, dongle, or other interface), or embedded in, an electronic device. Examples of electronic applications are discussed below. A node 100 enables the electronic device to send data to, and receive data from, other electronic devices that are equipped with nodes 100.

Figure 4:
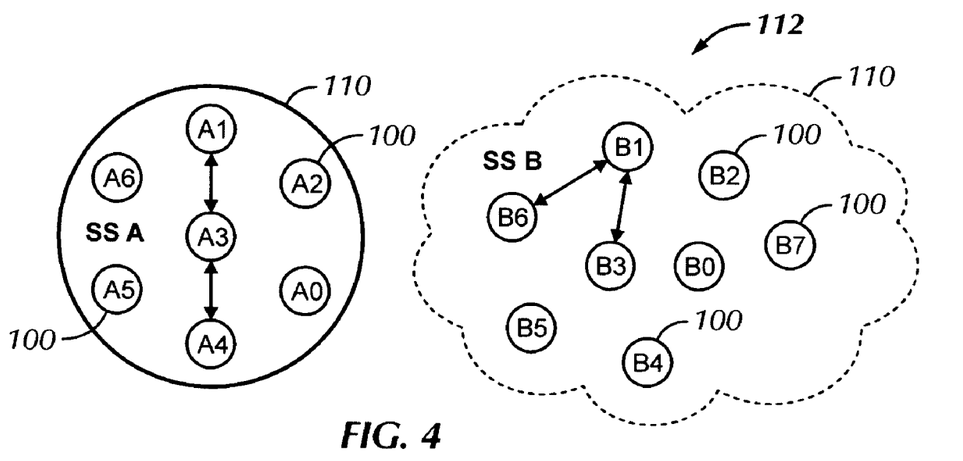
FIG. 4 illustrates the formation of a galaxy.

The nodes 100 transfer data directly among themselves by forming an organized ad-hoc network, or "solar system" (SS), which is indicated by reference numeral 110 in FIG. 4, with the data transfer being indicated by the arrows. The nodes 100 within an SS 110 can also transfer data directly with nodes 100 in other SSs 110 when the nodes 100 are within the same given radio range, or "galaxy," which is indicated by reference numeral 112 in FIG. 5, with the data transfer being indicated by arrows. In addition, the nodes 100 within one galaxy 112 can transfer data with nodes 100 in other galaxies 112 if their individual coordinating nodes and/or other nodes 100 within their respective SSs 110 are from contiguous galaxies 112, or within the same "universe," which is indicated by reference numeral 113 and which is discussed in detail below.

Figure 6:
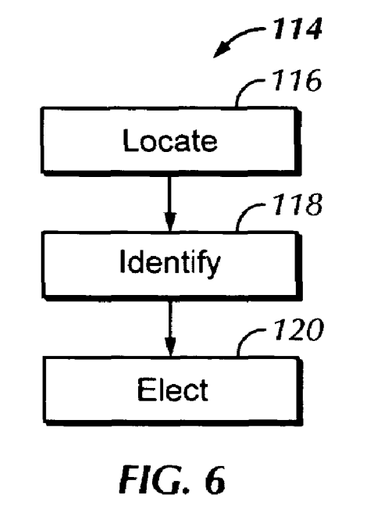
FIG. 6 illustrates methodology for forming an SS according to a first phase.
Figure 7:
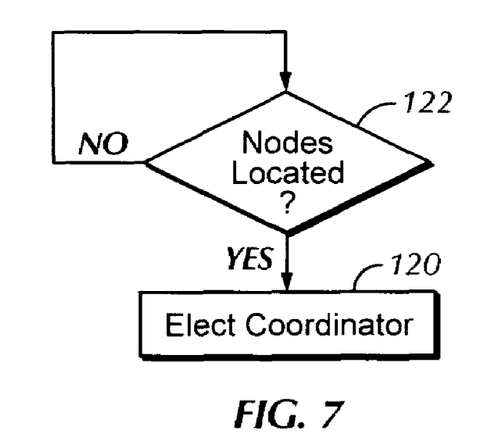
FIG. 7 illustrates methodology for electing a coordinating node of an SS.

An SS 110 may be formed in two phases as illustrated by formation methodology 114 of FIG. 6. In the first phase, each of the nodes 100 may emit pings to locate other nodes 100 (step 116) within a given radio range, broadcast their serial numbers, or "tags," to identify themselves (step 118), and send out "Election Ballot" (EB) packets to elect a coordinator, or "sun," (step 120) for the new SS 110. These broadcasts may take place in a carrier-sense manner and may last for a set time period (for example, less than one second). When two or more nodes 100 locate each other and have sent out EB packets as shown by step 122 in FIG. 7, the nodes 100 may automatically elect the node 100 (step 120) with the highest serial number among them as coordinating node, or coordinator. This first phase methodology is also indicated by reference numeral 124 in FIG. 1.

Figure 8:
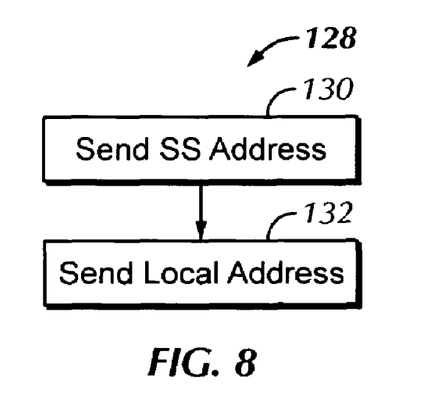
FIG. 8 illustrates methodology for forming an SS according to a second phase.

In the second phase as indicated by reference numeral 126 in FIG. 1 and by SS formation methodology 128 in FIG. 8, the elected coordinator may send each node 100 an SS address (step 130) and a local address (step 132). The SS address is used to recognize the node's participation in the SS 110. The local address is used to set each node's position in the SS's round-robin cycle for sending data to the other nodes 100 in the SS 110. A node's data transmission attaches its SS and local addresses. After the nodes 100 receive their SS and local addresses from the coordinator, the SS 110 is ready for operation, and the nodes 100 can transfer data among themselves freely. As shown in FIG. 1, the coordinator may acknowledge each of the nodes 100 with an SS address and a local address, which acknowledgements are indicated by Ack 0, Ack 1, . . . , Ack N.

Figure 9:
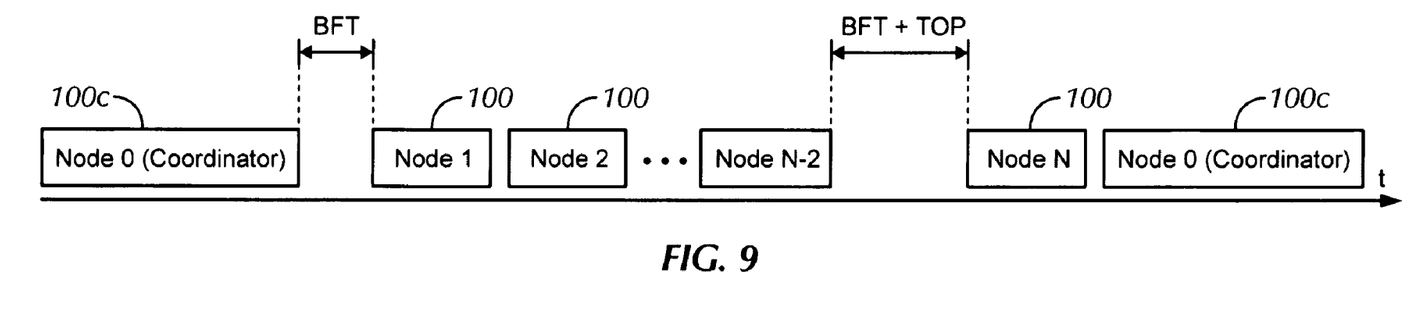
FIG. 9 illustrates a round-robin allocation and use of bandwidth in an SS.

With reference to FIG. 9, after the nodes 100 establish an SS 110, the coordinating node, or coordinator, which is indicated by 100C, may allocate amounts of bandwidth to each node 100 on a rotating basis. During each rotation, the coordinator 100C includes the amount of bandwidth allocated to each node 100 in the packet that the coordinator 100C sends out to all the other nodes 100 in the SS 110, and each node 100 includes its bandwidth request for the next round in the packet it sends out. The amount of bandwidth allocated to a node 100 may depend on the amount requested by the individual node 100 relative to the amount of bandwidth requested by all of the other nodes 100 in the SS 110. This allocation process ensures that the SS 110 runs efficiently and is fair to all of the nodes 100. This allocation process may be described as a round-robin allocation process. In FIG. 9, N equals the total number of nodes 100 in the SS 110, and t represents time.

As an operational example with reference to FIG. 9, Node N is only allowed to transmit data after Node N−1 finishes its transmission and the wireless channel is free for a variable period of time known as the "Between Frame Time" (BFT). If at the time Node N−1 has nothing to transmit, Node N−1 keeps silent, and after the wireless channel is free for BFT plus a set period of time known as the "Time Out Period" (TOP) (i.e., BFT+TOP), Node N comes up and the round-robin or sequential cycle continues.

The data transmissions of each node 100 go to all of the other nodes 100 in the same SS 110. Each node 100, however, may process only the transmissions that were intended specifically for it (as signified by its local address). Each node 100 may include a filter to discard all other packets.

After an SS 110 has been established, nodes 100 may join or leave the SS 110 at any time. When a node 100 wants to leave an SS 110, the node may wait until its turn in the round-robin cycle to transmit a "Request to Exit" (RTE) packet. When the coordinator 100C receives the RTE packet, the coordinator 100C may use a portion of its next slot in the round-robin cycle to reassign local addresses to all of the remaining nodes 100, and the round-robin cycle continues uninterrupted. If a node 100 in the SS 110 does not transmit data for a set number of round-robin cycles, then the coordinator 100C may automatically assume that the non-transmitting node 100 has left the SS 100, and may reassign local addresses to all of the remaining nodes 100.

When a node 100 wants to join an existing SS 110, it must wait until the wireless channel is free for a set period of time known as the "Insert Waiting Time" (IWT), where IWT<BFT, to transmit a "Request to Join" (RTJ) packet. When the SS's coordinator 100C receives the RTJ, the coordinator 100C may use a portion of its next slot in the round-robin cycle to reassign local addresses to all of the nodes 100, and the new node 100 may join the enlarged SS 110. All nodes 100 that join an existing SS 110 submit to the original coordinator 100C, even though they may have a higher serial number. The coordinator 100C may be set to automatically accept or reject new nodes 100 or to respond to each new node's request separately.

Figure 9A:
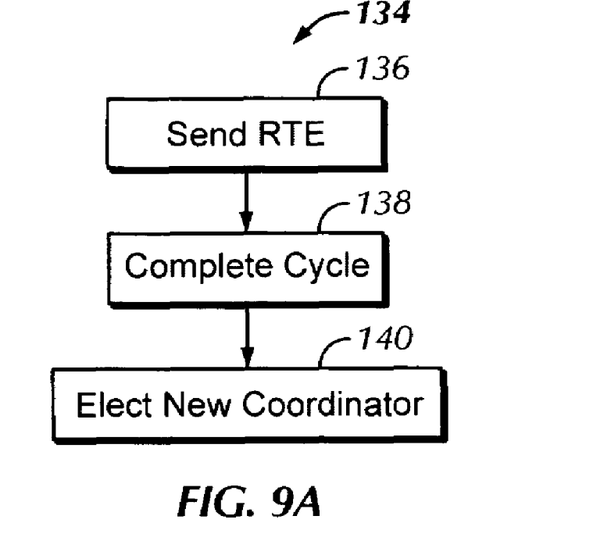
FIG. 9A illustrates methodology when a coordinator exits an SS by sending a request.
Figure 9B:
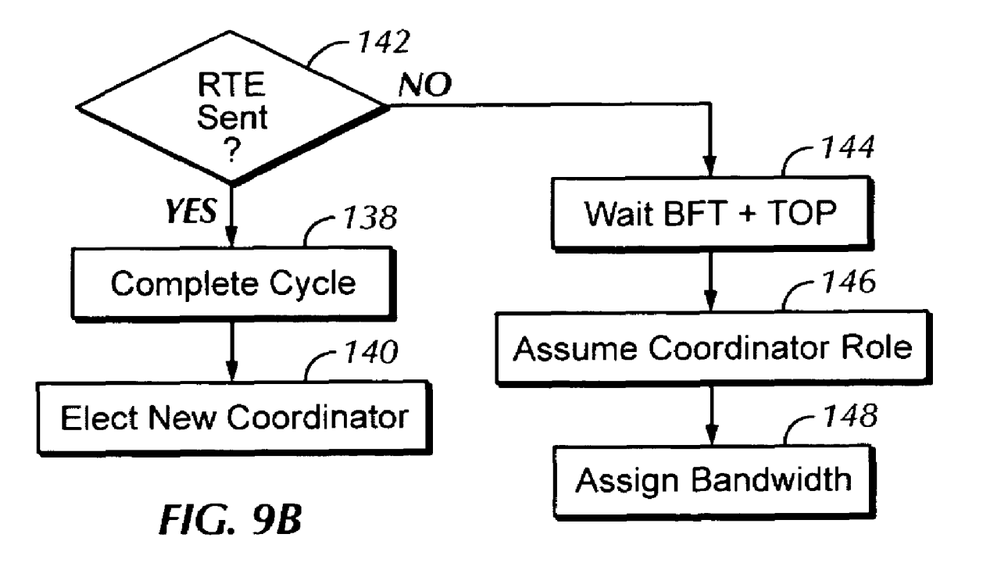
FIG. 9B illustrates methodology when a coordinator exits an SS without sending a request.

Reference is made to FIG. 9A for methodology 134 that may be utilized when a coordinator 100C wants to exit an SS 110. To exit an SS 110, the coordinator 100C may send an RTE packet (step 136) to all of the nodes 100 in the SS 110. When the nodes 100 receive the coordinator's RTE, the nodes 100 may finish the cycle in progress (step 138) and then elect the remaining node 100 (step 140) with the highest serial number among them to serve as the new coordinator 100C. This process of electing a new coordinator 100C may take less than one second. As shown in FIG. 9B, if the coordinator 100C exits the SS 110 without sending out a RTE packet (step 142) (for example, in the case of an unexpected error), after waiting a period of BFT+TOP (step 144), the first node in the SS (e.g., Node 1 as depicted in FIG. 9) assumes the coordinator role (step 146) and assigns an equal amount of bandwidth (step 148) (preferably for the next round of broadcasts only) to each of the remaining nodes 100 in the SS 110. The SS 110 then continues operating as described above.

When there are only two nodes 100 in an SS 110 and when one of the nodes 100 wants to leave the SS 100, the leaving node 100 may send an RTE packet to the other node 100, with the SS 110 being dissolved instantaneously. Both nodes 100 are then free to set up new SSs 110 or join other existing SSs 110.

Figure 5:
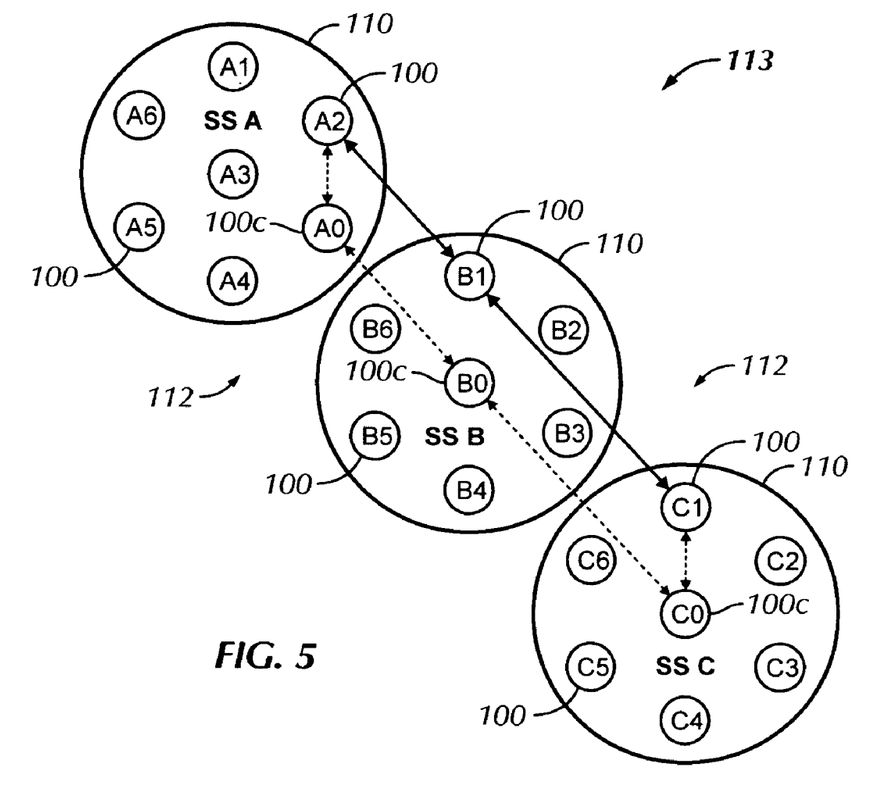
FIG. 5 illustrates the formation and operation of multiple SSs in a galaxy and/or a universe according to a number of embodiments.

The nodes 100 within one SS 110 can communicate directly with nodes 100 in other SSs 110 if the individual nodes 100 are within the same given radio range, or "galaxy," as indicated by reference numeral 112 in FIG. 5. An extended ad-hoc network, or "galaxy," may be formed when nodes 100 from two or more SSs 110 are within the same given radio range. The nodes 100 distinguish themselves in the galaxy 112 by their SS addresses and local addresses.

If a node 100 in one SS 110 wants to communicate directly with a node 100 in another SS 110, the node may first listen for the data transmissions of the other nodes 100. All of the nodes 100 within a given radio range receive the packets of other nodes 100 in the same radio range and frequency, although each node 100 may process only the packets intended specifically for it. If a node 100 does not receive another node's data transmissions, the node cannot communicate with the other node 100 directly. After the node 100 receives the other node's address details, the first node 100 can use its allocated bandwidth to send packets to the second node.

With reference to FIG. 5, SS A may already be running when SS B emerges in the same given radio range and channel forming a galaxy 112. Originally, Node A2 of SS A could not communicate directly with Node B1 of SS B because Node B1 either did not exist or was located outside of Node A1's radio range. Once SS B begins sharing the same given radio range and frequency as SS A, Node A2 may receive all of Node B1's data transmissions as well as Node B1's SS and local addresses. Node A2 may then use this information to send packets to Node B1 and vice versa.

Figure 10:
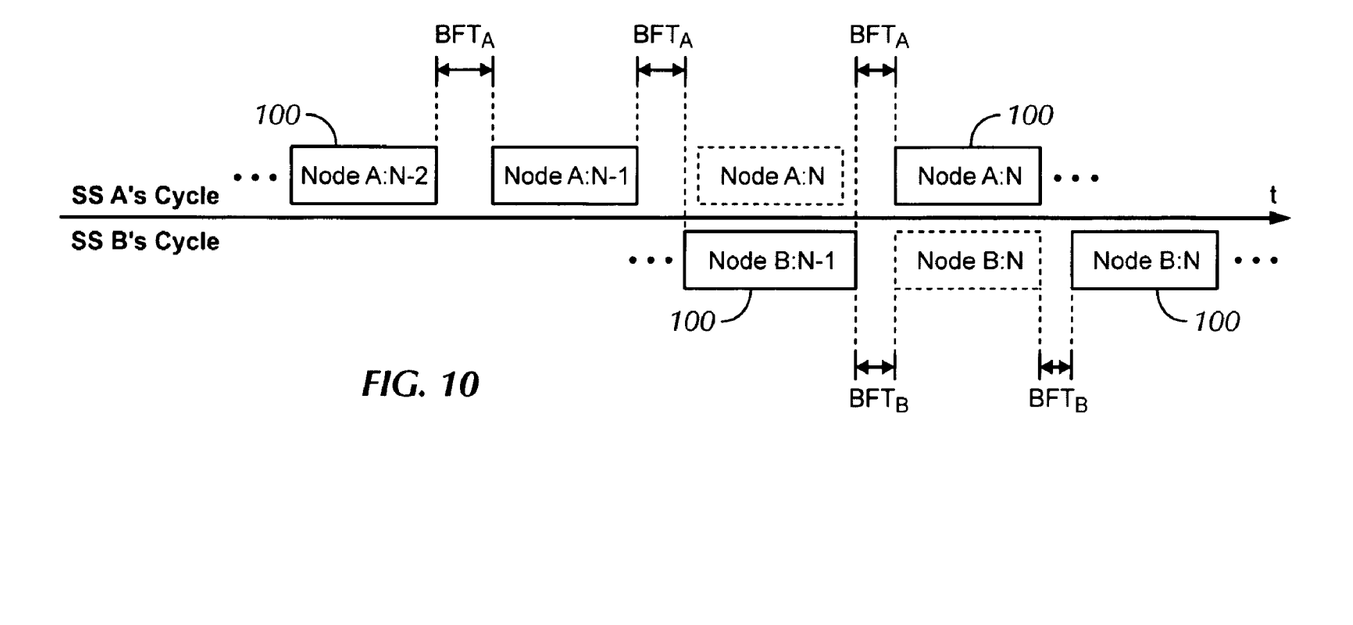
FIG. 10 illustrates the operation of a galaxy according to a number of embodiments.

When nodes 100 from two or more SSs 110 form a galaxy 112, the SSs 110 may share a common wireless channel in a competitive fashion. Each SS's round-robin cycle inserts into each other SS's BFT. With reference to FIG. 10, the SSs 110 in a galaxy 112 may set their own BFTs. The lower an SS's BFT is set, the higher its share of the common wireless channel. An SS 110 with a low BFT has less chance of having its round-robin cycles interrupted by the insertions of other SSs' round-robin cycles. FIG. 10 shows how SSs 110 share a common wireless channel in a galaxy 112, where N equals the total number of nodes 100 in each SS 110 and t represents time.

When a new node 100 comes into a galaxy 112, the node 100 may choose which SS 110 to join. The node 100 may first listen for each SS 110 in the galaxy 112 to complete at least one round-robin cycle. After receiving the address of each SS 110, the new node 100 may send an RTJ packet to whichever SS 110 the node 100 may want to join.

When two or more nodes 100 want to establish a new SS 110 in an existing single-frequency galaxy 112, the nodes 100 may each broadcast an EB packet, instead of an RTJ packet. All nodes 100 that broadcast EB packets form the new SS 110.

In a number of embodiments, the nodes 100 within one galaxy 112 can transfer data with nodes 100 in other galaxies 112 in the same frequency provided their coordinating nodes 100 are from contiguous galaxies 112, or within the same "universe," which is indicated by reference numeral 113 in FIG. 5. An overall ad-hoc network, or "universe," is formed when coordinators from contiguous galaxies 112 using the same frequency establish a "Virtual Backbone Network" (VBN) for facilitating multi-hop data transfers among their nodes 100. The coordinators 100C act in a self-organizing manner to set up the VBN, and rely on nodes 100 within their SSs 110 to act as relay stations for transferring data between nodes 100 from different galaxies 112. In these embodiments, a coordinator 100C may also serve as a relay station.

Once an SS 110 is established in these embodiments, the coordinating node 100C emits pings to broadcast information about its SS 110 and to locate all of the other coordinating nodes 100 within its galaxy 112. Through this process, the coordinating node maps all of the other SSs 110 within its galaxy 112 and, by relying on the maps of the other coordinating nodes 100 within its galaxy 112, gains a map of all of the galaxies 112 in the overall universe 113. This process works by way of message diffusion similar to the OSPF routing protocol on the Internet. With these maps, the coordinators 100C form a VBN for facilitating multi-hop data transfers among nodes 100 from different galaxies 112.

The VBN of a universe 113 provides the routing information for multi-hop information relays between nodes in different galaxies 112. When a node 100 in one galaxy 112 wants to send data to a node 100 in a different galaxy 112, it first attempts to locate the other node 110 by sending a "Search Request" (SR) packet to its SS coordinator 100C (which is indicated by A0, B0, and C0 in FIG. 5). The coordinator 100C transmits this request to all of the coordinators 100C within its own galaxy 112. If these coordinators 100C do not locate the node 100 in one of their SSs 110, then these coordinators 100C pass on the search request to all of the other coordinators 100C in their galaxies 112. Eventually, the search request spreads throughout all of the galaxies 112 in the universe 113.

If the node 100 is found, the node's coordinator 100C sends a response through the chain of coordinators 100C back to the original coordinator 100C. The coordinators 100C also establish an efficient chain of nodes 100, or relay stations, to conduct data transfers between the requesting node 100 and the responsive node 100. Each coordinator 100C may distribute the relay work among the nodes 100 in its SSs 110 equally, or may otherwise ensure that a relay node is not disadvantaged (relative to the other nodes in the SS) by the relay work. If the responsive node 100 is not found within a certain time period, the original coordinator 100C sends a "Not Found" packet to the requesting node 100.

In the example shown in FIG. 5, SS A and SS B are in the same galaxy 112, and SS B and SS C are in the same galaxy 112. Nodes A2 and C1 cannot contact each other directly because they are not within the same given radio range. Node A2 therefore sends an SR packet for Node C1 to its coordinator A0. Coordinator A0 transmits this packet to coordinator B0, which relays it to coordinator C0. Coordinator C0 responds through coordinator B0 that C1 is in its SS, and coordinators C0, B0, and A0 then establish a multi-hop connection using Node B1 as a relay station to facilitate data transfers between Nodes A2 and C1. Coordinator B0's selection of Node B1 to serve as the relay station for this data transfer may be based on an equal distribution of relay work within SS B or otherwise to ensure that Node B1 is not disadvantaged (relative to the other nodes in SS B) by the relay work.

In addition to the example shown in FIG. 5, in a number of embodiments, two or more SSs 110 in the same radio range may use different frequency bands, and the same frequency bands may be used by additional SSs 110 outside the respective radio ranges of the original SSs 110. A group of nodes 100 may establish a new SS 110 in a distinct radio frequency (within the same radio range, or galaxy 112, as other SSs 110) by scanning the useable radio channels and selecting an available frequency to form their own SS 110. The nodes 100 in the new SS 110 may then communicate with nodes in other SSs 110 within the same galaxy 112 (and, by extension, overall universe 113) through the use of bridge nodes 100B, such as shown in FIG. 11.

Figure 11:
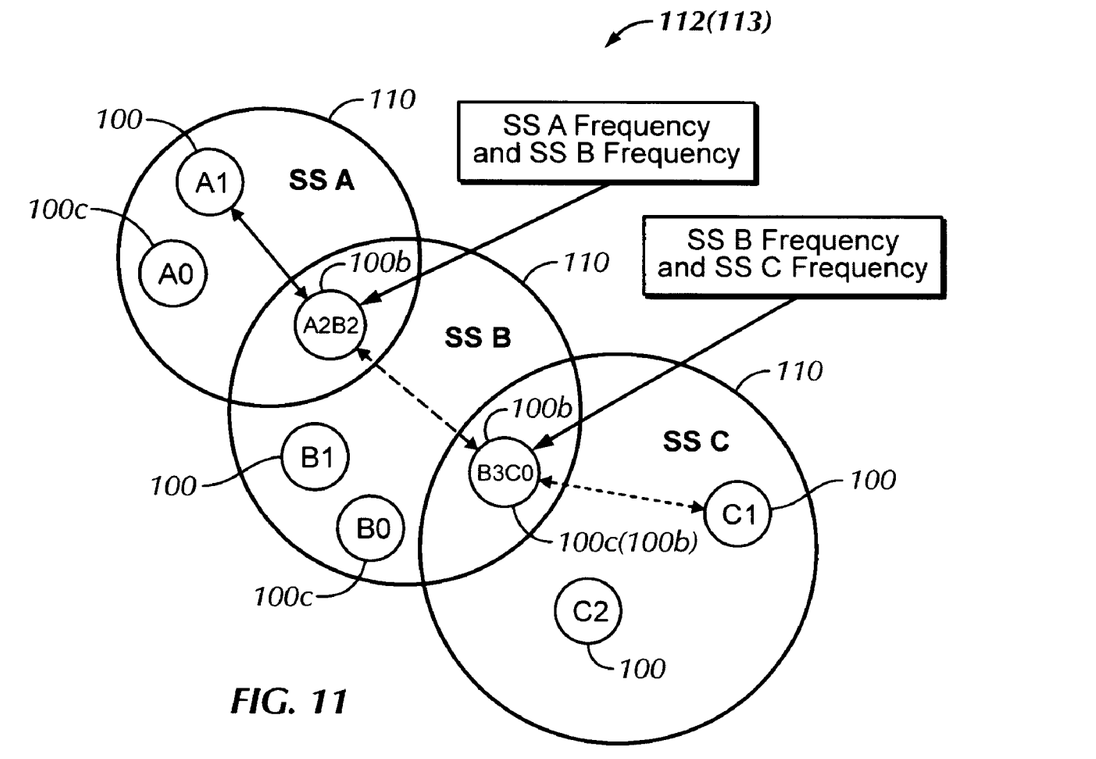
FIG. 11 illustrates the operation of a multiple SSs in a galaxy and/or a universe according to a number of other embodiments.

The bridge nodes 100B may operate simultaneously on two channels, the frequency used by their own SS 110 and a frequency used by another SS 110 within the same radio range, or galaxy, as shown by the dashed and solid lines in FIG. 11. The bridge nodes 100B may scan other frequencies within their radio range to discover and link to other SSs 110. In these embodiments, the coordinating nodes 100C may work with the bridge nodes 100B to compose a virtual backbone network (VBN) across a galaxy 112 and universe 113. The coordinating nodes 100C continue to facilitate, or direct, data transfers among nodes in different SSs 110, while the bridge nodes 100B transfer, or relay, all inter-SS data packets. In FIG. 11 the SSs 110 may be in the same galaxy 112 (if they are in the same radio range) or universe 113 (if SS B belongs to the galaxies of both SS A and SS C). There may be more than one bridge node 100B (operating on different frequencies) in an SS 110, as shown in SS B in FIG. 11, and the coordinating node 100C for an SS 110 may also serve as a bridge node 100B, as exemplified in SS C in FIG. 11. By significantly reducing radio interference between SSs 110 within a given radio range, these embodiments of the invention increase the system's operating capacity and reduce power consumption.

Figure 12:
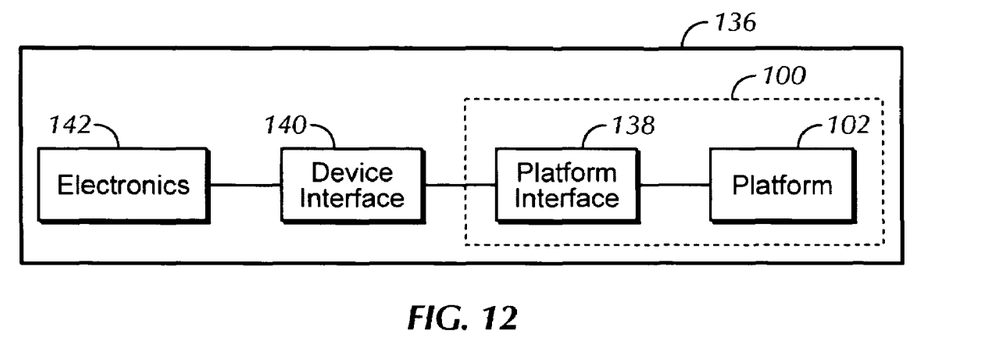
FIG. 12 is a block diagram of a node implemented in an electronic device.
Figure 13:
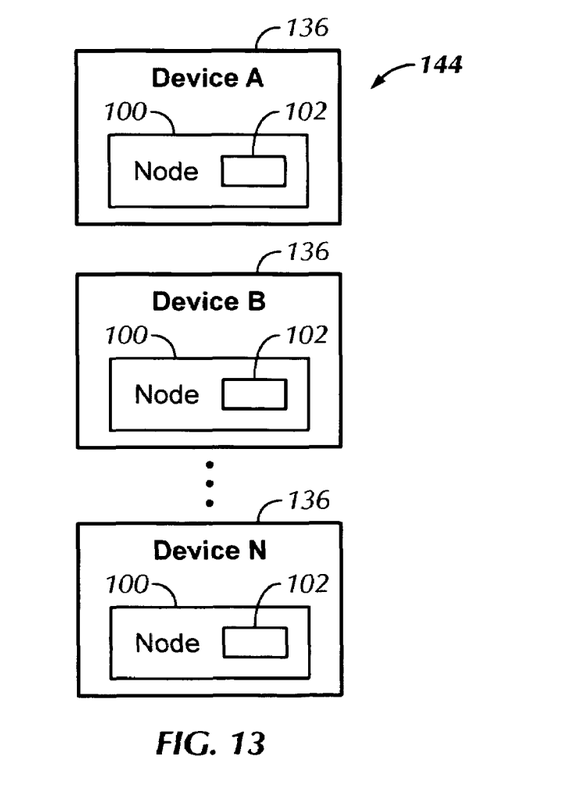
FIG. 13 illustrates a plurality of node-equipped electronic devices.

With reference to FIG. 12, to incorporate a node 100 in an electronic device 136, the node 100 may include a platform interface 138 that is connectable to a device interface 140, which in turn is in communication with electronics 142 of the device 136. In some of the embodiments, the platform interface 138 may be incorporated unitarily with the hardware platform 102, or may be a separate board or device. Accordingly, as shown in FIG. 13, a plurality of node-equipped electronic devices 136 may define a wireless network 144 of electronic devices 136. Examples of electronic devices are provided below.

In other embodiments, the hardware platform 102 may be embedded in the device 136. In these embodiments, the hardware platform 102 may communicate directly with the device electronics 142, thereby eliminating the need for the interfaces 138 and 140.

Terminology

For the purposes of this description, a number of terms are used in describing the principles of the invention, including node, solar system, sun, galaxy, and universe. Explanations of how these terms are used follows.

A node 100 may consist of hardware and either software or firmware that together enable the node to send data to, and receive data from, other nodes 100. Nodes 100 may be either connected to (e.g., by way of an external plug, key, or dongle) or embedded in electronic devices 140, and thus enable such electronic devices 140 to communicate with each other. All nodes 100 may be stamped with a globally identifiable serial number, or "tag." The tag may be a 64-bit binary number, and may be burned into the flash memory at the manufacturing facility. A tag distinguishes each node 100. After an SS 110 is formed, each node 100 in the SS 110 is assigned an SS address and a local address. These addresses distinguish each node within its SS 110, galaxy 112, and universe 113.

Although all nodes 100 may be the same functionally, nodes 100 play different roles in the operation of an SS 110. During the process of forming an SS 110, the node 100 with the highest serial number is elected as the SS's coordinator 100C, or "sun." The coordinating node 100C assigns each node 100 in the SS 112 with an address, such as an 8-bit address. After the formation of the SS 110, the coordinator 100C uses this address to allocate bandwidth to each of the nodes 100 on a rotating basis. This allocation ensures that the nodes 100 in the SS 110 share the wireless channel in a collision-free manner. The coordinating node 100C also facilitates data transfers between nodes 100 in its SS 110 and nodes 100 in other galaxies 112 by forming a "Virtual Backbone Network" (VBN) with coordinators from contiguous galaxies 112, or within the same "universe" 113. In some embodiments of the invention, the coordinators 100C transfer data among each other through the use of bridge nodes 100B that each operate on two frequencies.

An ad-hoc network, or "solar system" (SS) 112, may be formed when two or more nodes 100 within a given radio range join together and elect a coordinator 100C, which in turn assigns the nodes 100 local addresses for transferring data in a round-robin, collision-free manner. The local addresses can be based on the serial numbers of the nodes 100, distance from the coordinator 100C, or other factors, depending on the network's requirements. The nodes 100 act in a self-organizing manner to set up the SS 112. Once the SS 112 is established, the nodes 100 in the SS 112 can transfer data among themselves freely. Nodes 100 can join or leave an SS 112 at any time. However, in a number of embodiments, the nodes 100 may be a part of only one SS 112 at any given time.

An extended ad-hoc network, or "galaxy" 112, may be formed when nodes 100 from two or more SSs 112 are within the same given radio range. These nodes 100 may communicate directly with each other (if they are in the same radio range and share the same radio frequency). Nodes 100 can join or leave a galaxy 112, and nodes 100 can be a part of multiple galaxies 112. Nodes 100 can choose which SS 110 to join in a galaxy 112 or to form a new SS 110 in an existing galaxy 112.

An overall ad-hoc network, or "universe" 113, may be formed when coordinators 100C from contiguous galaxies 112 establish a "Virtual Backbone Network" (VBN) for facilitating multi-hop data transfers among the respective nodes 100. The coordinators 100C act in a self-organizing manner to set up the VBN, and may rely on nodes 100 within their SSs 110 to bridge SSs operating on different frequencies or to otherwise serve as relay stations for transferring data between nodes 100 from different galaxies 112.

Examples of Commercial Applications

The methods and apparatus have a number of applications with a number of devices (exemplified in FIG. 12). For example, in the field of PC community data transfer and communications, the nodes 100 and associated methodology may be applied in word processing and document sharing, PowerPoint processing and presentation sharing, Excel processing and spreadsheet sharing, video game communities, e-mail processing, file sharing, and MSN, ICQ and other communication applications.

In the field of PC accessory data transfer and communications, the nodes 100 and associated methodology may be applied in printers, mouse controls, scanners, electronic cameras, headphones, MP3 players, PDA's, and speakers. In the field of audio and video communication devices, the nodes 100 and associated methodology may be applied in cell phones and cordless phones. In the field of home appliance data transfer, the nodes 100 and associated methodology may be applied in audio equipment such as stereos and speakers, televisions, refrigerators, air conditioners and heaters, coffee makers, and projectors. The nodes 100 and associated methodology may also be applied in animal and livestock tracking and in remote control toys (e.g., cars, boats, animals).

In the field of security system data transfer, the nodes 100 and associated methodology may be applied in sensor communication and coordination. In the field of automobile data transfer, the nodes 100 and associated methodology may be applied in crash sensors (e.g., car-to-car or car-to-railing) and car identification. In the field of meters and reading devices, the nodes 100 and associated methodology may be applied in meters for measuring water, gas, electricity, and parking duration. The nodes 100 may also be applied in location sensors to monitor the location and movement of objects within a given space.

Provided below is an example of a source code program which embodies the principles of the invention and represents the best mode to carry out the invention at this time.

Those skilled in the art will understand that the preceding embodiments of the present invention and the source code example provide the foundation for numerous alternatives and modifications thereto. These other modifications are also within the scope of the present invention. Accordingly, the present invention is not limited to that precisely as shown and described in the present invention.

What is claimed is:

1. A method for forming an ad-hoc network with a plurality of nodes, the method comprising:

electing a coordinating node from the plurality of nodes, the coordinating node then:

assigning an ad-hoc network address to each of the other nodes with the ad-hoc address recognizing participation of a respective node in the network; and assigning a local address to each of the other nodes with the local address setting a position of a respective node in the network, wherein the electing step comprises:

emitting pings from each of the nodes to locate nodes within a radio range; broadcasting a tag from each of the located nodes to identify each of the located nodes; sending out an election-ballot packet by each of the identified nodes to each of the other identified nodes, wherein the electing step further comprises electing the coordinating node based on information in the tags, wherein each of the tags includes a serial number, the electing step further comprises electing the node with the highest serial number.

2. The method of claim 1 wherein the coordinating node further allocates bandwidth to each of the nodes on a rotating, collision-free basis.

3. The method of claim 2 wherein the coordinating node allocates bandwidth based on an amount of bandwidth requested by all of the nodes in the network.

4. The method of claim 1 further comprising communicating data among each of the nodes in the network in a sequential cycle.

5. The method of claim 4 further comprising communicating data to one or more nodes in another ad-hoc network that is within radio range.

6. The method of claim 5 further comprising forming a virtual backbone network with the coordinating nodes in each of the networks.

7. The method of claim 5 wherein the coordinating nodes map all of the ad-hoc networks within a galaxy and/or universe.

8. The method of claim 5 wherein a node requests the coordinating node associated therewith to search for a node outside the ad-hoc network associated therewith, and wherein the coordinating nodes determine whether the node outside of the ad-hoc network is present.

9. The method of claim 5 wherein the coordinating nodes facilitate data transfers between nodes located in different radio ranges and/or frequencies.

10. The method of claim 5 wherein the coordinating nodes appoint and use one or more nodes to relay data transfers between nodes located in different radio ranges.

11. The method of claim 5 wherein the coordinating nodes rely on one or more bridge nodes that each operate on two radio frequencies to relay data transfers between nodes located in different radio frequencies and/or ranges.

12. The method of claim 1 wherein the coordinating node further recognizes that a node is leaving the network.

13. The method of claim 1 wherein the coordinating node recognizes that a node wants to join the network.

14. The method of claim 1 wherein the coordinating node transfers coordinating duties thereof to another one of the nodes within the network.

15. The method of claim 1 wherein the coordinating node leaves the network without notification, the method further comprising one of the nodes assuming role of coordinating node for the network.

16. The method of claim 1 wherein the coordinator node assigns new addresses to the nodes in the network and shares the new addresses with the coordinating node in at least one other ad-hoc network within radio range.

17. The method of claim 1 wherein at least one of the nodes is designated as a bridge node which periodically monitors other ad-hoc networks operating on different frequencies within the same radio range.

18. The method of claim 17 wherein the bridge node operates simultaneously on two radio frequencies and in two ad-hoc networks.

19. The method of claim 17 wherein a plurality of ad-hoc networks operate on the same frequency in different radio ranges and each include at least one bridge node, the plurality of ad-hoc networks being wirelessly connected together by the bridge nodes operating on other frequencies.

20. The method of claim 1 wherein the nodes establish the network on an available frequency in a radio range with other existing ad-hoc networks operating on other frequencies.

* * * * *

UNITED STATES PATENT AND TRADEMARK OFFICE
CERTIFICATE OF CORRECTION

PATENT NO. : 7,593,374 B2  Page 1 of 1
APPLICATION NO. : 11/121837
DATED : September 22, 2009
INVENTOR(S) : Lin Zhang It is certified that error appears in the above-identified patent and that said Letters Patent is hereby corrected as shown below:

Col. 9 lines 2-3
The last line of Claim 1 should read "the electing step further comprises electing the coordinating node based on its serial number."

Signed and Sealed this

Ninth Day of November, 2010

David J. Kappos
*Director of the United States Patent and Trademark Office*